United States Patent [19]
Ditlinger et al.

[11] 3,887,042
[45] June 3, 1975

[54] PISTON AND EXTENSIBLE CYLINDER THEREFOR

[75] Inventors: Richard J. Ditlinger; Richard W. Kerr; Lyle E. Massing, all of South Bend, Ind.

[73] Assignee: The Bendix Corporation, South Bend, Ind.

[22] Filed: July 22, 1974

[21] Appl. No.: 490,631

[52] U.S. Cl. ............... 188/71.8; 92/13.4; 92/52; 188/72.4; 188/196 R; 188/370; 192/111 A
[51] Int. Cl. ............................................. F16d 65/52
[58] Field of Search. 188/72.4, 72.5, 71.8, 79.5 GE, 188/196 B, 196 R, 370; 92/13.4, 18, 19, 23, 52; 192/111 A

[56] References Cited
UNITED STATES PATENTS

| | | | |
|---|---|---|---|
| 3,255,851 | 6/1966 | Griesenbrock | 188/196 F |
| 3,337,008 | 8/1967 | Trachte | 188/196 B |
| 3,789,738 | 2/1974 | Horner | 92/52 X |

Primary Examiner—George E. A. Halvosa
Attorney, Agent, or Firm—Gordon H. Chenez; William N. Antonis

[57] ABSTRACT

A fluid pressure actuated piston is slidably carried in a fluid pressure actuated cylinder which, in turn, is slidably carried in a fixed carrier and engageable with a stop which stop is defined by a plurality of balls arranged in a column between a fixed retaining member and the cylinder and contained by a cylinder slidable relative thereto. The ball-containing cylinder is surrounded by the piston which is provided with axially spaced apart abutments one of which is engageable with the ball-containing cylinder during an extension stroke of the piston thereby displacing the cylinder relative to the column of balls thereby releasing one or more of the balls from the column whereupon the fluid pressure actuated cylinder is urged axially toward the piston and into engagement with the remaining column of balls. Release of all of the balls results in engagement of the ball-containing cylinder with the fixed retaining member thereby extending the range of travel of the piston accordingly.

10 Claims, 3 Drawing Figures

3,887,042

PISTON AND EXTENSIBLE CYLINDER THEREFOR

BACKGROUND OF THE INVENTION

The present invention relates to fluid pressure actuated force generating pistons having an extended range of travel. Reference is made to U.S. application Ser. No. 480,797 in the name of R. J. Ditlinger filed June 19, 1974 and assigned to the assignee of the present application for a similar type extensible cylinder and piston arrangement wherein the present invention is an improvement thereover.

Fluid pressure actuated pistons of the extensible type of which we are aware are not entirely satisfactory for use in aircraft multiple disc brakes for various reasons including structural complexity, excessive weight and/or volume, limited operating life and/or reliability, maintenance requirements and/or assembly and disassembly problems.

SUMMARY OF THE INVENTION

The present invention provides a fluid pressure actuated piston slidably contained in a force actuated cylinder held in a retracted position by a variable length stop member responsive to piston movement and progressively shortened thereby to permit the cylinder to advance axially relative to the piston thereby extending the range of piston travel accordingly.

The present invention provides a fluid pressure actuated piston slidably contained in a fluid pressure actuated cylinder held in a retracted position by a variable length stop member engageable therewith and responsive to piston movment wherein the stop member is progressively shortened as the piston advances in the cylinder to permit the cylinder to advance relative to the piston thereby extending the range of piston travel accordingly.

The present invention provides a fluid pressure actuated piston slidably contained in a force actuated cylinder wherein the cylinder is held in a retracted position by stop means defined by a column of balls which balls are progressively released in response to movement of the piston to reduce the effective length of the column and permit advancement of the cylinder relative to the piston accordingly.

DESCRIPTION OF THE PREFERRED EMBODIMENT

Figure 1:
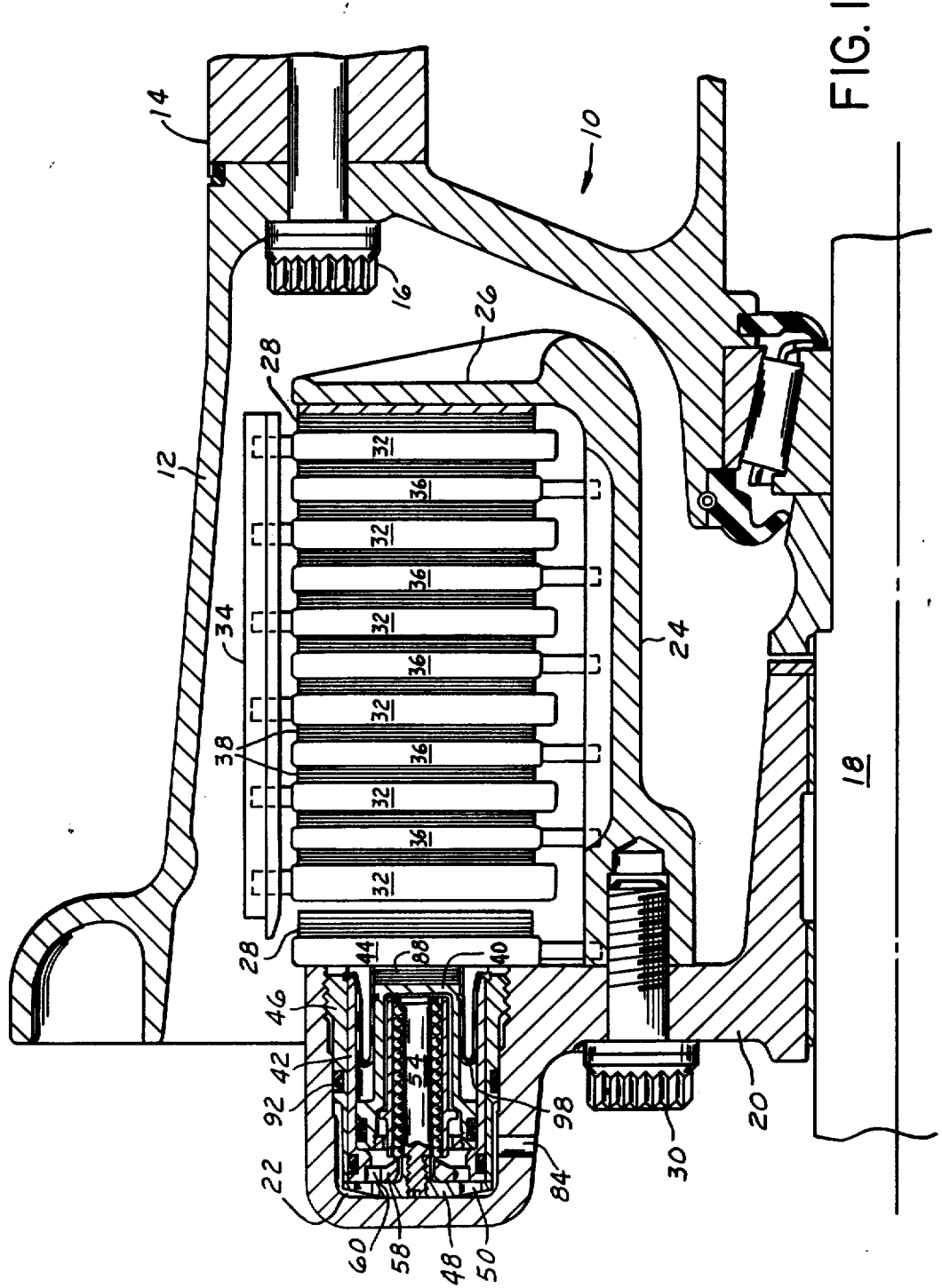
FIG. 1 represents a sectional schematic drawing of a conventional fluid pressure actuated multiple disc aircraft brake embodying the present invention.
Figure 3:
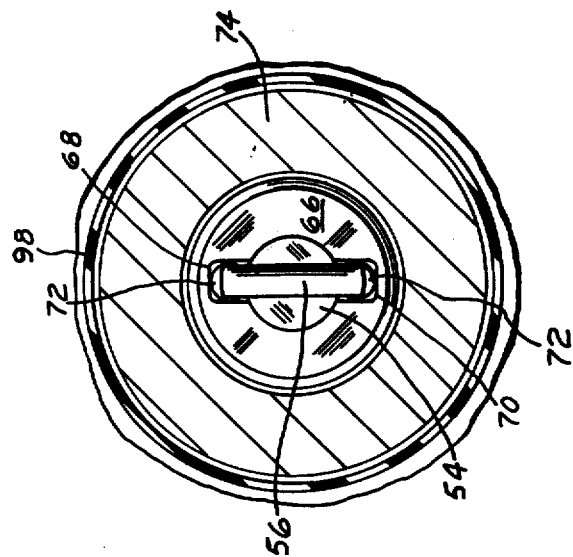
FIG. 3 represents a section view taken on line 3—3 of FIG. 2.
Figure 2:
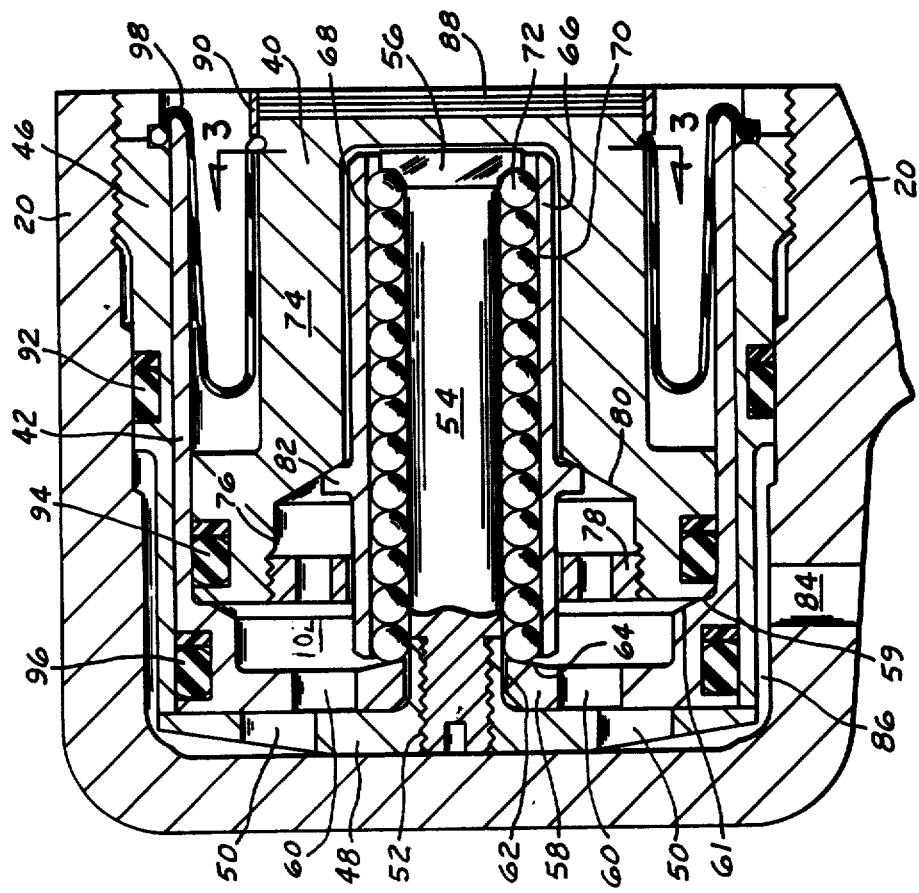
FIG. 2 represents an enlarged view of the present invention shown in FIG. 1 and shown removed from the remaining brake structure.

Referring to FIG. 1, numeral 10 designates an aircraft wheel and multiple disc brake therefor. The wheel is defined by two annular sections 12 and 14, only one of which is fully shown, fastened together by circumferentially spaced apart bolts and nuts generally indicated by 16. The wheel is suitably journaled on a rotatably fixed axle 18 carried by conventional aircraft landing gear structure, not shown. An annular brake carrier 20 suitably keyed or otherwise secured to axle 18 is provided with a plurality of circumferentially spaced apart circular cavities 22, only one of which is shown, vented to a source of pressurized fluid, not shown, controlled by the aircraft pilot. A torque tube 24 having an integral backing plate 26 suitably lined with friction 28 is fixedly secured to brake carrier 20 by a plurality of circumferentially spaced apart bolts 30. A plurality an annular brake rotor members or discs 32 are suitably keyed to a retaining member 34 fixedly secured to wheel section 12 and adapted to permit axial movement of the rotor members 32 relative to wheel section 12. A plurality of annular brake stator members or discs 36 having friction lining 38 secured to opposite faces thereof are alternately arranged with rotor members 32 and suitably keyed for axial movement on torque tube 24.

The cavities 22 are each provided with brake actuating mechanism including a fluid pressure actuated piston 40 slidably contained in a fluid pressure actuated cylinder 42. The pistons 40 are adapted to be simultaneously pressurized and urged axially against an annular pressure plate 44 suitably keyed for axial movement to torque tube 24 which pressure plate 44 compresses the rotor and stator members 32 and 36 together against the resistance of backing plate 26 to retard motion of rotor members 32 and thus wheel section 12. The pressure plate 44, like backing plate 26, is lined with friction material 28.

It will be recognized that the pistons 40 are necessarily confined in a limited space and must have an axial travel range sufficient to compensate for the accumulative axial wear of the friction linings 28 and 38 over a period of brake use. To that end, the cavities 22 are each provided with a sleeve or cylinder 46 threaded at one end thereof for threaded engagement with carrier 20. A circular plate 48 having a plurality of spaced apart openings 50 and a central threaded opening 52 is held against the base of cavity 22 by sleeve 46 bearing against the radially outermost portion thereof.

A retaining member is defined by a post or rod 54 one end of which is threadedly engaged with opening 52 and the opposite end of which is provided with a cross bar 56 integral with or otherwise fixedly secured thereto. The cross bar 56 extends diametrically across rod 54 and beyond the periphery thereof.

The piston cylinder 42 has an end wall 58 provided with an annular shoulder 59 and a plurality of spaced apart openings 60 which openings register with openings 50. The radial inner portion of shoulder 59 is beveled as shown at 61 for a purpose to be described. The end wall 58 has a central opening 62 through which rod 54 extends with sufficient clearance to permit cylinder 42 to freely slide along rod 54 as will be explained. An annular ramp 64 is formed on the inner portion of end wall 58 surrounding rod 54.

A sleeve 66 slidably carried on rod 54 has diametrically opposed axially extending channels 68 and 70 each of which are adapted to receive a column of spherical members such as balls 72 formed of a suitably hard material to prevent deformation thereof under the forces imposed thereon as will be described.

The brake actuating piston 40 slidably received by cylinder 42 includes a central cup-shaped portion 74 which slidably receives sleeve 66. An annular recess 76 in the inner wall of the open end of piston 40 is threaded to receive an annular nut 78 which, with the end wall 80 of recess 76, establishes axially spaced apart abutments. A radially outward extending annular flange 82 formed on sleeve 66 is adapted to be engaged by end wall 80 or nut 78 depending upon the direction of axial movement of piston 40 relative to sleeve 66 as will be described.

High pressure fluid from the pilot controlled source, not shown, is conducted to each cavity 22 via a suitable passage network including passage 84. From passage 84, the fluid passes through an annular recess 86 in sleeve 46 and through openings 50 and 60 to the side of piston 40 exposed thereto.

The piston 40 may be provided with a layer of suitable insulation material 88 fixedly secured thereby by any suitably means such as retaining member 90 to minimize heat transfer from pressure plate 44 to piston 40.

The sleeve 46, piston 40 and piston cylinder 42 are suitably recessed to receive conventional "O" ring seals 92, 94, and 96, respectively, to minimize fluid leakage from the high pressure side to the relatively lower pressure side of piston 40. It will be noted that the low pressure side of piston 40 is exposed to atmospheric pressure. A suitable rolling type dust seal 98 having its radially outermost portion connected to sleeve 46 and innermost portion to piston 40 serves to exclude dust and the like from the inner wall of cylinder 42.

Assuming that the present invention is in assembled status as shown in FIG. 1, a brake application by the aircraft pilot results in pressurization of passages 84 and thus pistons 40 vented thereto thereby equally pressurizing pistons 40 into engagement with pressure plate 44 which, in turn, urges rotor and stator members 32 and 36 into frictional engagement against backing plate 26 to produce desired braking action of the wheel.

Depressurization of passages 84 results in a retraction of pressure plate 44 and thus pistons 40 bearing thereagainst by virtue of conventional retraction spring units, not shown, suitably connected to carrier 20 and pressure plate 44. Such retraction spring units normally include a brake reset feature which limits retraction of the pressure plate to a predetermined axial distance thereby maintaining a corresponding brake or disc running clearance when the brake is released. Reference is made to U.S. Pat. application Ser. No. 387,093, filed Sept. 9, 1973, in the name of E. Harnish and R. Horner (common assignee) for an example of such a retraction spring unit.

It will be recognized that repeated brake applications in the above-mentioned manner will result in progressive wear of the friction linings 28 and 38 necessitating a corresponding greater axial displacement of pistons 40 which displacement of each piston 40 is normally limited by the permissible travel in cylinder 42. Such limited displacement of piston 40 may not permit taking full advantage of the collective wear capability of the friction linings 28 and 38. The present invention overcomes such an undesirable limitation during a brake application by allowing piston 40 to move axially until nut 78 engages flange 82 whereupon continued movement of piston 40 results in a corresponding axial displacement of sleeve 66. As the sleeve 66 moves relative to the columns of balls 72, one or more of the balls 72, in sequence, of each column depending upon the number uncovered by sleeve 66 are urged radially outwardly from rod 54 by annular ramp 64 which bears against the column of balls 72 under the influence of the pressurized fluid acting against the end wall 58. It will be noted that the effective area of end wall 58 adjacent plate 48 is greater than the effective area on the opposite side of end wall 58 thereby establishing a force unbalance tending to urge ramp 64 against the columns of balls 72. The cylinder 42 axially advances toward sleeve 66 as the balls 72 are displaced until the spacing between the ramp 64 and the end of sleeve 66 becomes too small for a ball 72 to pass therebetween whereupon each remaining column of balls 72 is trapped between sleeve 66 and rod 54 thereby preventing further axial movement of cylinder 42. It will be noted that maximum axial advancement of cylinder 42 is attained when all of the balls 72 are released from channels 68 and 70 allowing ramp 64 to move into engagement with cross bar 56. The resulting total range of axial travel of piston 40 within cylinder 42 will be noted to be in excess of the effective length of cylinder 42 within which piston 40 slides thereby providing the required extended travel of piston 40 as the friction linings 28 and 38 progressively wear under repeated brake applications.

The brake is released in response to depressurization of the pistons 40 which are retracted a preset amount to establish the heretofore mentioned brake running clearance by the retraction spring units, not shown. The piston 40 is free to retract until either end wall 80 contacts flange 82 or piston 40 contacts annular shoulder 59. However, since the heretofore mentioned predetermined brake running clearance established by the retraction spring units, not shown, is selected to be less than the axial travel of piston 40 before the above-mentioned engagement of flange 82 or annular shoulder 59 by piston 40 occurs, the piston 40 will retract the required full brake running clearance.

It is recognized that during release of balls 72 from channels 68 and 70, a ball 72 could become lodged between the end of sleeve 66 and ramp 64 thereby restricting advancement of cylinder 42 under the influence of the pressure unbalance across end wall 58. However, the axial retraction of piston 40 under the influence of the retraction spring units is less than the spacing between nut 78 and end wall 80 such that, even with a ball 72 lodged between sleeve 66 and ramp 74 in the above-mentioned manner, the piston 40 is free to retract to the extent required to establish the heretofore mentioned predetermined brake running clearance without engagement of end wall 80 with flange 82. In any event, the sleeve 66 and cylinder 42 are not influenced by retraction of piston 40 which feature is desirable since retraction of cylinder 42 would result in a corresponding increase in volume of fluid required to apply the brake whereas retraction of sleeve 66 would necessitate a corresponding increase in force necessary to retract piston 40. It is desirable to maintain the force levels necessary to apply and release the brake at substantially constant values over the operating range of the brake as will be recognized by those persons skilled in the art.

The annular chamber 102 surrounding sleeve 66 is sufficiently large in volume to provide storage of the balls 72 as the balls 72 are released from sleeve 66.

The beveled portion 61 of annular shoulder 59 is provided to assist in urging any balls 72 radially inwardly away from annular shoulder 59 as piston 40 approaches annular shoulder 59 thereby allowing the latter to be contacted by piston 40.

A significant advantage of the above described extensible fluid pressure actuated apparatus is apparent in that the elements contained by cavity 22 may be easily assembled to form a complete unit contained by sleeve 46 which sleeve is subsequently threaded into position in cavity 22. Also, the various elements may be reassembled without replacement of the sleeve 66 or balls 72 for overhaul purposes.

We claim:

1. Extensible fluid pressure actuated apparatus including a piston slidably carried in a cylinder for a multiple disc aircraft disc brake provided with fixed piston carrier means providing limited axial travel for the piston carried thereby, said fluid pressure actuated apparatus comprising:
   a controlled source of pressurized fluid;
   a fluid pressure responsive cylinder slidably carried in said carrier means and having an end wall;
   a fluid pressure responsive piston slidably carried in said cylinder;
   passage means communicating said cylinder and said piston with said pressurized fluid;
   a fixed retaining member having an axially spaced apart relationship with said end wall and engageable therewith;
   stop means including a plurality of spherical members arranged in column form and interposed between said fixed stop member and said end wall whereby the axial position of said end wall relative to said retaining member is dependent upon the number of spherical members in said column; and
   means operatively connecting said piston and said stop means for displacing one or more of said spherical members from said column in response to axial movement of said piston away from said end wall to permit said cylinder to axially follow said piston under the influence of said pressurized fluid acting thereagainst.

2. Extensible fluid pressure actuated apparatus as claimed in claim 1 wherein:
   said carrier means is provided with a cavity adapted to receive a sleeve member threadedly secured to said carrier means;
   said cylinder being slidably disposed in said sleeve member.

3. Extensible fluid pressure actuated apparatus as claimed in claim 2 and further including:
   a plate member having a threaded central opening therein and fixedly secured in position against the base of said cavity by said sleeve member bearing thereagainst;
   said retaining member including a rod member threadedly secured at one end in said central opening and extending axially therefrom through said end wall and provided with a transverse abutment at the free end thereof.

4. Extensible fluid pressure actuated apparatus as claimed in claim 3 wherein:
   said stop means includes a sleeve having at least one axially extending channel formed in the inner wall thereof and adapted to receive a plurality of balls;
   said fluid pressure responsive cylinder is axially aligned with said rod member and provided with an end wall having a central opening through which said rod member extends;
   an annular ramp is formed on said end wall adjacent said central opening and engageable with said column of balls for urging said balls radially outwardly from said sleeve in sequence upon movement of said sleeve axially relative to said column of balls.

5. Extensible fluid pressure actuated apparatus as claimed in claim 1 wherein:
   said stop means includes a sleeve having diametrically opposed axially extending channels formed in the inner wall thereof each of which channels is adapted to contain a column of said spherical members.

6. Extensible fluid pressure actuated apparatus as claimed in claim 5 and further including:
   a radially outwardly extending flange formed on said sleeve; and
   spaced apart first and second abutment means on said piston adapted to engage said flange;
   said first abutment means engaging said flange to urge said sleeve axially away from said end wall in response to axial movement of said piston to thereby expose one or more of said spherical members which exposed spherical members are urged radially outwardly from said column thereby permitting said end wall to advance axially toward said piston in response to the fluid pressure acting against said end wall.

7. Extensible fluid pressure actuated apparatus as claimed in claim 6 wherein said aircraft disc brake includes brake retracting means for retracting said piston a predetermined axial distance to establish a corresponding disc clearance upon release of said brake and wherein:
   said predetermined axial distance is less than the spacing between said spaced apart first and second abutment means.

8. Extensible fluid pressure actuated apparatus as claimed in claim 5 wherein:
   said piston is cup-shaped and slidably receives said sleeve coaxial therewith.

9. Extensible fluid pressure actuated apparatus as claimed in claim 5 wherein:
   said fluid pressure responsive cylinder is axially aligned with said sleeve and provided with an end wall having a ramp portion bearing against said columns of spherical members;
   said ramp portion urging said spherical members radially outwardly from said sleeve upon movement of said sleeve axially relative to said columns of spherical members.

10. Extensible fluid pressure actuated apparatus as claimed in claim 1 wherein:
    a substantially constant brake applying force is generated by said piston in response to said pressurized fluid acting thereagainst.

* * * * *